(12) United States Patent
Mishra et al.

(10) Patent No.: US 11,139,658 B2
(45) Date of Patent: Oct. 5, 2021

(54) POWER CONVERSION SYSTEM AND METHOD

(71) Applicant: SIGNIFY HOLDING B.V., Eindhoven (NL)

(72) Inventors: Priya Ranjan Mishra, Eindhoven (NL); Goutam Maji, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 13 days.

(21) Appl. No.: 16/610,821

(22) PCT Filed: May 8, 2018

(86) PCT No.: PCT/EP2018/061770
§ 371 (c)(1),
(2) Date: Nov. 4, 2019

(87) PCT Pub. No.: WO2018/206529
PCT Pub. Date: Nov. 15, 2018

(65) Prior Publication Data
US 2020/0067320 A1 Feb. 27, 2020

(30) Foreign Application Priority Data

May 11, 2017 (IN) .............................. 201741016549
Sep. 1, 2017 (EP) .................................... 17188990

(51) Int. Cl.
*H02J 3/38* (2006.01)
*H02J 7/35* (2006.01)
*H02M 3/156* (2006.01)

(52) U.S. Cl.
CPC ................ *H02J 3/385* (2013.01); *H02J 7/35* (2013.01); *H02M 3/156* (2013.01)

(58) Field of Classification Search
CPC ..... G05F 1/67; H02J 1/08; H02J 3/385; H02J 7/35; H02J 2300/26; H02J 3/381; H02M 3/156; Y02E 10/56
(Continued)

(56) References Cited

U.S. PATENT DOCUMENTS 6,252,785 B1 6/2001 Hagihara et al.
6,369,462 B1 4/2002 Siri
(Continued)

FOREIGN PATENT DOCUMENTS

EP 0959552 A2 11/1999
EP 1047179 A1 10/2000
WO 2010126522 A1 11/2010

OTHER PUBLICATIONS

Shenoy, et al., "Comparative Analysis of Differential Power Conversion Architectures and Controls for Solar Photovoltaics", Control and Modeling for Power Electronics (COMPEL), 2012 IEEE 13th Workshop on IEEE, Jun. 10, 2012, pp. 1-7.

*Primary Examiner* — Toan T Vu

(57) ABSTRACT

A power conversion system has a plurality of power tracking converters connected in parallel to an output of an energy source such as a solar system. A communication system between the converters implements a sequence of operation of the converters, such that in response to a communication signal from a preceding converter in the sequence, each converter performs tuning of its power tracking function and then provides a communication signal to the next converter in the sequence. Each converter for example functions as a maximum power point tracking system. The system may be made from a set of smaller units so that different systems may be formed from a small set of standard components. By operating the converters in a sequence, conflict between the converters and instability is avoided.

15 Claims, 2 Drawing Sheets

(58) Field of Classification Search
USPC .................................................. 307/66–88
See application file for complete search history.

(56) References Cited

U.S. PATENT DOCUMENTS

| 6,433,522 | B1* | 8/2002 | Siri | H02J 3/383 |
| | | | | 323/272 |
| 2008/0204098 | A1 | 8/2008 | Qahouq et al. | |
| 2010/0264744 | A1 | 10/2010 | Schmitt et al. | |
| 2014/0119075 | A1 | 5/2014 | Adest et al. | |

* cited by examiner

POWER CONVERSION SYSTEM AND METHOD

CROSS-REFERENCE TO PRIOR APPLICATIONS

This application is the U.S. National Phase application under 35 U.S.C. § 371 of International Application No. PCT/EP2018/061770, filed on May 8, 2018, which claims the benefit of European Patent Application No. 17188990.0, filed on Sep. 1, 2017 and Indian Patent Application No. 201741016549, filed on May 11, 2017. These applications are hereby incorporated by reference herein.

FIELD OF THE INVENTION

This invention relates to power conversion systems and methods, and in particular to systems and methods for converting power from a variable power source.

BACKGROUND OF THE INVENTION

Power conversion systems are used to collect energy from an energy source and to deliver the energy to a load or energy storage system. They are for example widely used for collecting energy from renewable energy sources such as solar systems.

By way of example, solar energy generation utilizing the rooftop areas of buildings or using low cost land is increasingly being used. The load may be the utility grid or it may be battery points.

Power conversion takes place for the energy delivered by a solar system to provide the most efficient collection and storage of energy. Typically, this makes use of maximum power point tracking ("MPPT") systems, which control the operating point of the solar system (current and voltage) to achieve optimum power transfer. Typically, there are different size MPPT systems for different sizes of solar system installation. This results in an increase in inventory and reduces the benefit of volume production. For example, by increasing manufacturing quantity from 1000 to 10000, production cost generally decrease by 30-40%.

As load requirements change, power conversion systems may need to be scaled up, by adding more energy sources (e.g. solar PV cells), and their associated power conversion systems such as the MPPT system, charge controllers and batteries. Generally, the MPPT system is replaced with a different design of the appropriate size for the newly scaled solar system. The smaller sized MPPT system then becomes redundant or useless.

Thus, it is highly desirable to produce a reduced set of different MPPT system designs which can be used in a wider range of applications.

It is of course possible to design one MPPT system to cover various installation sizes. However, it will be oversized for a smaller system, and the PWM control resolution will be poor at lower insolation levels, so the tracking efficiency will be low. Furthermore, the system oscillatory behavior will increase around the maximum power point in a solar system operating with an oversized MPPT system.

Therefore, there is need for a system which enables the use of standard MPPT systems for differently sized energy sources and power conversion systems, but which does not result in the inefficient use of an overrated system.

EP1047179A1 discloses a method of operating a power supply system having parallel-connected inverters. One inverter operates as a master unit and other as slave units. The slave unit is turned on/off when the output power from a DC source is above or below a threshold. The master unit uses MPPT while the slave unit is constant power.

SUMMARY OF THE INVENTION

The invention is defined by the claims.

It is a concept of embodiments the invention to provide a set of MPPT converters in parallel with each other (at their input). The number of converters can be scaled to the overall size of the power conversion system and energy source. A communications system is provided so that the power point tracking function takes place in a sequence, so as to avoid instability and to reduce the amount of duplicated signal analysis. A further concept of the embodiments of the invention is that the power point tracking function in one MPPT converter gives an indication to how to do the power point tracking function in a next MPPT converter in the sequence, so the whole system moves towards the overall maximum power point of the energy source.

According to examples in accordance with an aspect of the invention, there is provided a power conversion system to be used with an energy source, comprising:

a plurality of converters each comprising a pair of input terminals and a pair of output terminals, wherein the input terminals are connected in parallel and are for connection to an output of the energy source, wherein each converter comprises an input power monitor and a power converter circuit whose power converter conversion ratio is adjustable, wherein the communication system is adapted to implement a sequence of operation of the converters, such that in response to a communication signal from a preceding converter in the sequence, each converter performs tuning of its power converter circuit, said tuning means perform an adjustment of the power converter conversion ratio; observe whether there is improvement in maximum power point tracking caused by said adjustment, and then provides a communication signal to the next converter in the sequence wherein said communication signal is adapted to notify an increase or decrease of the power converter conversion ratio in the next converter, according to whether the improvement is observed.

It is in essence a perturb and observe method in a distributed manner: one converter changes its conversion ratio, observes whether there is improvement in maximum power point tracking caused by this change, and, most importantly, instructs a next converter how to change its conversion ratio according to whether the improvement is observed. What is important is that this procedure is per converter in a string of converters, and implicitly happens at a high frequency: each adjustment and observing in one converter would trigger a next converter to operate. This system provides multiple converters in parallel to the input. Each converter for example functions as a maximum power point tracking system. The system may be made from a set of smaller units so that differently sized systems may be formed from a small set of standard components. These components may thus be combined to scale the overall system to different sizes. The components can thus also be made with greater economies of scale. By operating the converters in a sequence, conflict between the converters and instability is avoided. In particular, each converter performs its tuning (i.e. maximum power point tracking) in turn, with a chain of communications between the converters providing the timing for the sequential tuning operations. The tuning is for example based on controlling the switching behavior of the converters, which are for example each in the form of a DC-DC converter. This switching may be in one of two possible directions, for example an increased duty cycle or a decreased duty cycle of the DC-DC converter.

A communication system is further included in the power conversion system, and may comprise a communication line between each adjacent pair of converters in the sequence and from the last converter in the sequence to the first converter in the sequence.

This forms a daisy chain loop of communication lines. It avoids the need for a central master controller. Instead, each converter can operate independently, but with timing and information provided by the preceding converter in the series.

Each converter may be adapted to:

record an input power during a first time instant;

perform adjusting the power converter conversion ratio of its power converter circuit in a first or a second direction according to the communication signal from the preceding converter in the sequence, and detect its input power during a second time instant;

compare the input power at the second and the first time instants; and generate the communication signal to the next converter in the sequence which communication signal is dependent on the result of the comparing.

Each converter thus assesses whether a power converter circuit adjustment (which was selected by the preceding converter) was successful or not. It then decides how the next converter should adjust its power converter circuit. In this way, the power converter circuit adjustment at each converter is simplified. It simply makes an adjustment (e.g. an increase or decrease in duty cycle or more generally the power converter conversion ratio) as instructed by the preceding converter, checks whether or not an improvement (i.e. in maximum power point tracking) is observed, and then instructs the next converter to do the similar procedure.

Each converter may be adapted to record an input power during a first time instant by:

detecting and storing its input power during the first time instant after receiving the communication signal from the preceding converter in the sequence and before performing adjusting the power converter conversion ratio of its power converter circuit; or using the input power during the second time instant of a preceding sequence of operations as the input power in the first time instant.

Thus, the converter may make two input power measurements before and after the tuning at each cycle, or it may use the measurement from a previous cycle in combination with a measurement from the current cycle to form a pair of measurements. The first case has a very fast response speed for the system, while the second case lowers the cycle turnaround time due to a single measurement cycle per converter per cycle.

The communication signal for example comprises an instruction for the next converter to adjust the power converter conversion ratio of its power converter circuit in the same direction if the input power at the second time instant is greater than that at the first time instant, or else to tune its power converter circuit in the opposite direction.

Thus, one converter instructs the next as to the manner in which adjustment should be carried out. If a tuning in the preceding converter increases the output power of the energy source, a next converter will be instructed to do its tuning in the same manner as the present converter to continue the tracking; otherwise the next converter will correct the tuning of the preceding converter by applying an opposite tuning. The maximum power point tracking is distributed to the set of the converters automatically.

The system may further comprise a controller adapted to adjust the number of converters in the sequence between all converters or only a sub-set of the converters according to the required output power or the input power.

The overall system can be scaled to a particular design by selecting the number of converters. However, even a system with a set number of converters may be scaled, by selecting how many of the converters are used in a particular application, by leaving out some of the converters from the series arrangement.

The controller may comprise any one of a user interface or an automatic control so as to manually or automatically adjust the number of converters in the sequence by implementing a communication line connection between a converter which is selected to be the last in the sequence and the first converter in the sequence.

The scaling may be dynamic, for example (for a solar energy conversion system) based on the time of day, season or weather, all of which influence the maximum input power expected. Alternatively, the scaling may be set manually for a more static power requirement.

The converter may be further adapted to convey in the communication signal information indicative of an amplitude of the difference between the input power at the second time instant and that at the first time instant, and the converter is further adapted to perform tuning of its power converter circuit by a step based on said information indicative of the amplitude of the difference between the input power.

This amplitude analysis may be used to control not only the direction in which adjustment is made but also the size of an adjustment step so that the system can reach an optimum configuration more quickly.

The output terminals of the converters may be connected in parallel. This makes the system easily scalable both at the input side and the output side.

The invention also provides a solar power generation system comprising:

a solar cell array; and a power conversion system as defined above, wherein the energy source comprises the solar cell array.

The solar power generation system may further comprise a battery for being charged by the power conversion system; and/or a grid feeding inverter for being powered by the power conversion system and generating AC power for grid feeding.

Examples in accordance with another aspect of the invention provide a power conversion method, comprising:

receiving energy from an energy source;

providing a sequence of operation of a plurality of converters, wherein the method comprises for each converter in the sequence:

in response to receipt of a communication signal from a preceding converter in the sequence, performing energy conversion by monitoring the input power. tuning a power converter circuit and providing a communication signal for a next converter.

This method enables a set of standardized converters (such as maximum power point tracking converters) to be combined to form a larger power system.

The method may comprise, within each converter, in the sequence:

recording an input power during a first time instant;

performing adjusting the power converter conversion ratio of its power converter circuit in a first or a second direction according to the communication signal from the preceding converter in the sequence, and detecting its input power during a second time instant;

comparing the input power at the second and the first time instant; and generating the communication signal to the next converter in the sequence which is dependent on the result of the comparing.

This means that each converter provides information to the next so that the amount of signal processing needed in each converter is reduced.

The method may comprise recording an input power during a first time instant by:

detecting and storing its input power during the first time instant after receiving the communication signal from the preceding converter in the sequence and before performing adjusting the power converter conversion ratio of its power converter circuit; or using the input power during the second time instant of a preceding sequence of operations as the input power in the first time instant.

The communication signal may comprise an instruction for the next converter to tune its power converter circuit in the same direction if the input power at the second time instant is greater than that at the first time instant, or else to tune its power converter circuit in the opposite direction, wherein optionally the communication signal also conveys an amplitude of the difference between the input power at second time instant and that at the first time instant.

This may enable an optimum operating point to be found more quickly.

The method may comprise adjusting the number of converters in the sequence between all converters or only a sub-set of the converters according to the required output power or the input power.

The invention also provides a power converter to be used with an energy source, comprising a pair of input terminals and a pair of output terminals, wherein the input terminals are adapted for connection in parallel with the input terminals of other power converters and are for connection to an output of the energy source, an input power monitor and a power converter circuit whose power converter conversion ratio is adjustable; and the converter is adapted to implement a sequence of operation in cooperation the other converter, in which the converter is adapted: in response to a communication signal from a preceding converter in the sequence, to perform an adjustment of the power converter conversion ratio of the power converter circuit; to observe whether there is improvement in maximum power point tracking caused by said adjustment; and then to provide a communication signal to a next converter in the sequence, wherein said communication signal is adapted to notify an increase or decrease of the power converter conversion ratio in the next converter, according to whether the improvement is observed.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a power conversion system which has a plurality of power tracking converters connected in parallel to an output of an energy source such as a solar system. A communication system between the converters implements a sequence of operation of the converters, such that in response to a communication signal from a preceding converter in the sequence, each converter performs tuning of its power tracking function and then provides a communication signal to the next converter in the sequence. Each converter for example functions as a maximum power point tracking system. The system may be made from a set of smaller units so that different systems may be formed from a small set of standard components. By operating the converters in a sequence, conflict between the converters and instability is avoided.

Figure 1:
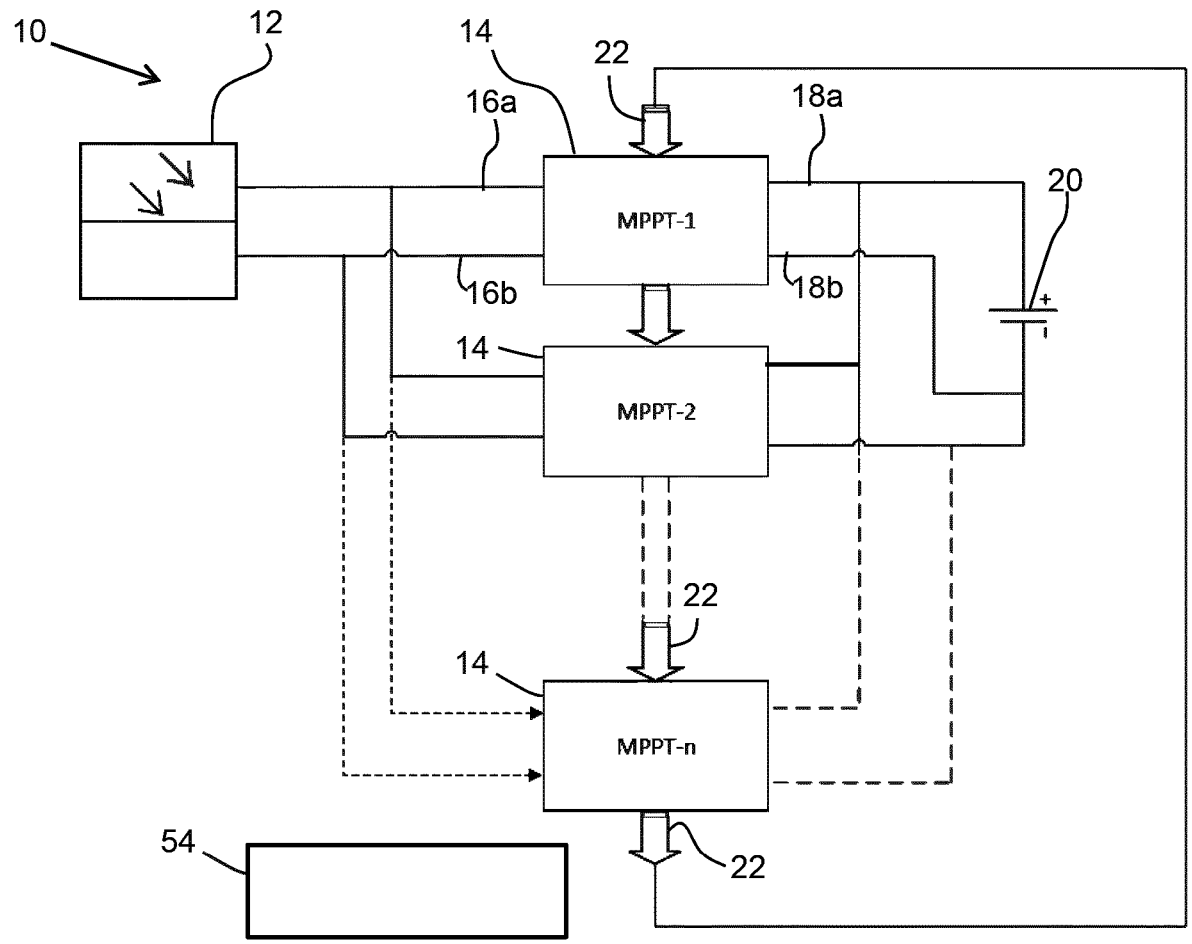
FIG. 1 shows a power conversion system.

FIG. 1 shows a power conversion system 10 which receives energy from an energy source 12. The invention is of particular interest for an energy source in the form a solar system comprising a photovoltaic solar cell array. However, the invention can be applied to other time-variable energy sources, such as other renewable energy sources.

The system 10 performs maximum power point tracking to provide efficient power conversion from the energy source 12, i.e. the solar system, to an output.

The system has a plurality of converters 14 each comprising a pair of input terminals 16a, 16b and a pair of output terminals 18a, 18b. The input terminals are connected in parallel to an output of the solar system 12. The outputs are also connected in parallel to a battery bank 20, although the power conversion system may also feed power back to the electricity grid using an inverter, or to power other device. The parallel connection of the output terminals makes the system easily scalable.

The number of converters (of similar sizes) operated in parallel will depend on the size of the installed solar system. For example, a streetlight with a 60 Watt peak solar panel may use one 12V/5 A converter whereas a 120 Watt peak installation may have two 12V/5 A converters. The system can be scaled to any size with additional converters.

There is a communication system between the converters 14, in the form of a communications line 22 from one converter to the next in a sequence, which sequence forms a closed loop. Thus, a last converter in the sequence is coupled to the first converter in the sequence by one of the communication lines. This forms a daisy chain loop of communication lines which avoids the need for a central master controller. Instead, each converter can operate independently, but with timing dependent on the output from the preceding converter in the series and using information provided by that preceding converter.

The communication system thus enables a sequence of operation of the converters to be followed, such that in response to a communication signal from a preceding converter in the sequence, each converter performs maximum power point tracking. It is noted that the daisy chain loop shows the logical communication path in accordance with the control sequence. The implementation of the daisy chain loop can be achieved by a real series lines, or it may be achieved by a star structure with a central hub, or by a bus, as long as the preceding converter can address the next converter in the sequence.

Figure 2:
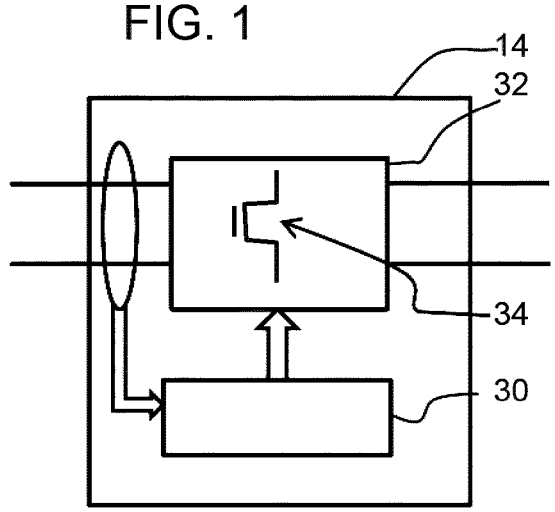
FIG. 2 shows one of the converters in more detail.

As shown in FIG. 2, each converter 14 comprises an input power monitor 30 and a tunable power converter circuit 32. The power converter circuit for example comprises a controllable DC-DC converter. The power converter circuit for example comprises a switched mode power supply including a main power switch 34. A duty cycle of the main power switch controls the DC-DC conversion ratio, and hence the ratio between the input voltage and the output voltage. The input power monitor monitors the current drawn from the solar system and the voltage delivered.

The maximum power point tracking of each converter comprises monitoring the input power and setting the DC-DC conversion ratio.

The individual converters may all be the same, so that economies of scale are obtained. By using different numbers of converters, differently sized systems may be formed from a small set of standard components.

By operating the converters in a sequence, conflict between the converters and instability is avoided. In particular, each converter performs its maximum power point tracking in turn, with a chain of communications between the converters providing the timing for the sequential tuning operations.

The maximum power point tracking may be based on a perturb and observe approach. This involves adjusting the input voltage (by changing the conversion ratio given that the output is connected to a fixed voltage) and observing if the input power has increased or decreased. In this way, the conversion ratio is continuously adjusted in one direction or the other, and the operating point of the system stabilizes (with small oscillatory adjustments) at the maximum power point. Oscillatory behavior of each converter around the maximum power point is reduced in both extreme conditions i.e. near full insolation as well as near zero insolation.

The maximum power point tracking involves determining in which direction to adjust the conversion ratio (i.e. to increase the ratio or to decrease the ratio), making an adjustment to the conversion ratio, and then reviewing the effect on the input power to determine if the adjustment was appropriate. The traditional maximum power point tracking is implemented in one single converter. The embodiments of the invention implement the maximum power point tracking in a distributed way, wherein determining in which direction to adjust the conversion ratio is carried out in one converter, and making an adjustment to the conversion ratio is carried out in a next converter. The communication between converters enables each one to implement a simplified procedure, by learning from the analysis of the preceding converter. In this way the set of converters can share the power more evenly in an automatic way.

Figure 3:
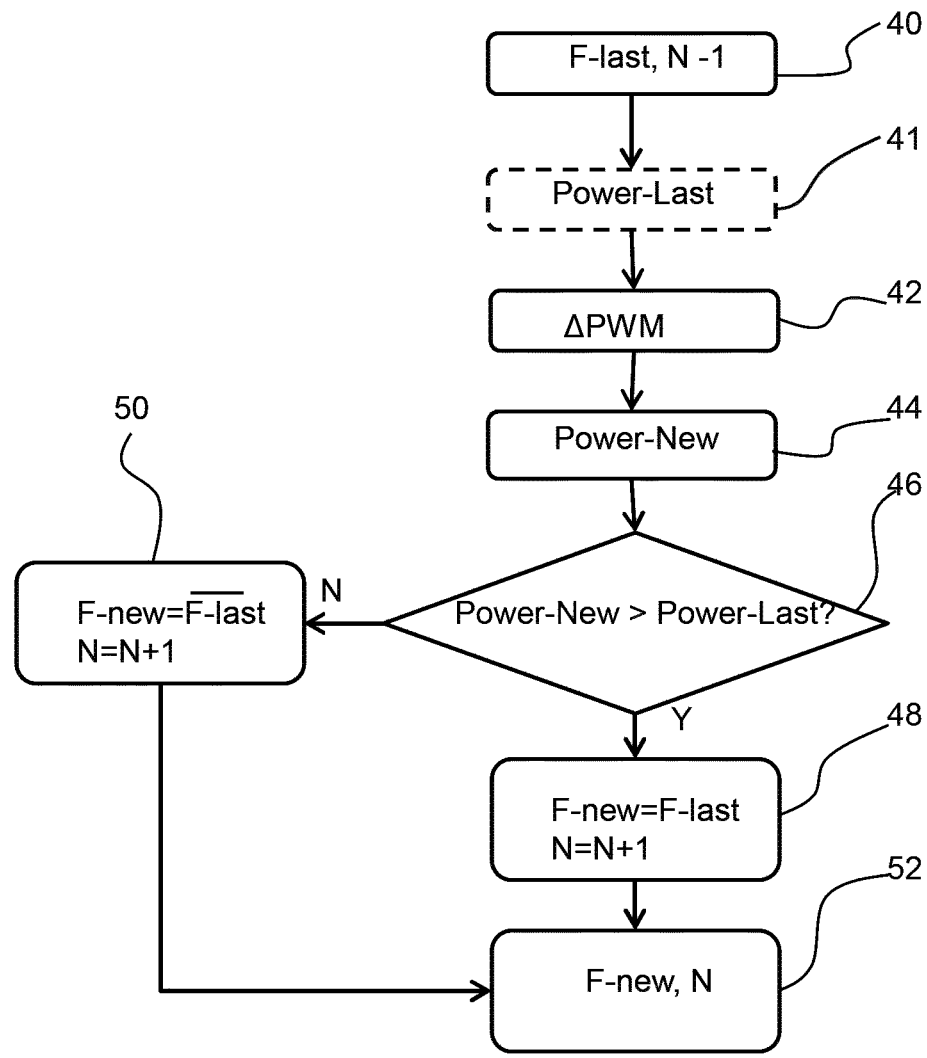
FIG. 3 shows a power conversion method.

FIG. 3 shows the maximum power point tracking method performed in each converter, in sequence. This method is performed in each converter and it then passes a message signal to the next converter which then performs the same method. The last converter is connected with the first one so that the maximum power point operation keeps running in a loop.

In step 40, a message is received from the preceding converter. Receipt of this message triggers the converter to start the method. The message contains a flag F (with value F-last) and optionally an identification number (N−1 in this example) of the converter which delivered the message. It is assumed that the preceding converter has number N−1 and the current converter is number N.

The flag F indicates whether the conversion ratio needs to be increased (F=0) or decreased (F=1).

The identification number N is optional. Indeed, the sequence may be fixed so that each converter knows from where it has received its input message. However, if different numbers and different sets of converters are enabled in a more dynamic manner, such identification may be used. For example, some converters with large power rate and large tuning step can be used in the beginning for rapidly approaching the maximum power point, and the other converters with small power rate and small tuning step can be used afterwards for fine tuning and reaching the maximum power point.

In step 42, the duty cycle is increased if F=0 and decreased if F=1. This duty cycle is implemented as a pulse width modulation signal for controlling the converter.

In step 44, the energy source power is measured locally (in converter N) and stored as a variable "Power-New". In step 46 the measured "Power-New" is compared to the previous value, denoted "Power-Last".

The previous power level "Power-Last" may be measured in step 41 before adjusting the duty cycle in step 42. However, this is optional, since the power measurement of step 44 from the preceding cycle may instead be used.

Following the comparison in step 46, if the change in power is positive then the flag value remains unchanged in step 48, otherwise if the change in power is negative the flag value is switched from 0 to 1 or 1 to 0 in step 50. In steps 48 and 50, the identification number N is increased by 1, i.e. from N−1 to N in this example.

The updated value of the flag F (F-new) and the updated converter number N are communicated to the next converter in the sequence, in step 52.

The same method is then repeated in next converter i.e. converter number N+1.

By this method, each converter records an input power during a first time instant, which may be just before the tuning of this cycle or it may be at the time of the preceding cycle. Tuning of the power converter circuit to adjust the conversion ratio is in a first or a second direction according to the flag F received from the preceding converter in the sequence. The input power is then detected during a second time instant, i.e. after the modification to the conversion ratio.

Each converter thus assesses whether a power converter circuit adjustment, in a direction which was dictated by the preceding converter, was successful or not. It then decides how the next converter should adjust its power converter circuit. In this way, the power converter circuit adjustment at each converter is correlated toward the maximum power. It simply makes an adjustment (e.g. an increase or decrease in duty cycle) as instructed by the preceding converter, then checks whether or not an improvement (i.e. in maximum power point tracking) is observed.

If a system has more converters than are needed, some may be bypassed by changing the communication loop. This may be an entirely manual process by which a larger system is adapted to a smaller power requirement. For example, the system can be set for a subset of converters manually by connecting the communication wire 22 from a newly selected last converter in the sequence to the first. For example 10 converters may be in the system. If only 5 converters are to be used because of a lower peak current capability of the energy source, the first converter input communication wire is changed from tenth to fifth. The system may then be a standard converter architecture for a large range of powers for the energy source.

However, this adaptation may instead be partially or fully automated. For this purpose, the system may further comprise a controller adapted to adjust the number of converters in the sequence between all converters or only a sub-set of the converters according to the required output power or the input power. A controller is shown schematically as 54 in FIG. 1.

For example, by field programming the converter which is to function as the last in the sequence, the communication through the converters which are not to be used can be implemented as a pass through function. This makes use of the identification number N and avoids the need for manual rewiring. The method of FIG. 3 can then be updated to include a step of verifying if the converter number is between 1 and N-last where the value N-last is programmed into the system and is either relayed between the converters as part of the message or is programmed into the converters as part of a calibration step. If the converter is not in the range 1 to N-last, then it can act in pass through mode.

Thus, a system with a set number of converters may be scaled, by selecting how many of the converters are used in a particular application, by leaving out some of the converters from the series arrangement, and this can be implemented for a system with static hardware configuration.

For an automated adjustment, there may be a user interface to allow the programming mentioned above, or there may even be fully automated control. The fully automated control may for example be based on the time of day, season or weather, all of which influence the maximum input power expected from a solar system.

Converters may then be added dynamically if all of the currently connected converters have reached or are approaching maximum power. Different sets of converters may then be enabled at different times and/or different power conditions, a cumulative power requirement over a time period may be matched to enhance reliability.

In a system with more converters than are needed, different sets of converters may be selected on different days (or other time periods) so as to enhance their life. For example, a PV system installation may have a 50 A peak current, but in low insolation period it can give a maximum current of 25 A. In those low insolation periods, only 5 converters will be turned on to enhance the converter resolution as well as their lifetime. The selected 5 converters may be rotated over time to share the usage of the modular components. In the example above, there is a fixed step change in conversion ratio (for example a change of 1 digital step in a PWM control signal). However, the communication signal passed from one converter to the next may additionally convey information indicative of an amplitude of the difference between the input power at the two time instants, thus representing an amount by which the power point deviates from the maximum power point. For example, if the difference is big, the next converter can use a large step; otherwise, the next converter can use a small step. The tuning of the power converter may be performed based on a step size which is derived from this information so that the maximum power point may be reached more efficiently.

The amplitude analysis then controls not only the direction in which adjustment is made but also the size of an adjustment step.

The invention enables the solar system to be scalable, and provides a low cost solution, for example with 8-bit microcontrollers. The converters can be more precisely controlled and they can all be operated at a similar power, giving an optimized lifetime.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power conversion system to be used with an energy source, comprising:
a plurality of converters each comprising a pair of input terminals and a pair of output terminals, wherein the input terminals are connected in parallel and are for connection to an output of the energy source, wherein each converter comprises an input power monitor and a power converter circuit whose power converter conversion ratio is adjustable; and
the converters are adapted to implement a sequence of operation in which each converter is adapted to:
in response to a communication signal from a preceding converter in the sequence, perform an adjustment of the power converter conversion ratio of its power converter circuit;
observe whether there is improvement in maximum power point tracking caused by said adjustment; and then
provide a communication signal to a next converter in the sequence, wherein said communication signal is adapted to notify an increase or decrease of the power converter conversion ratio in the next converter, according to whether the improvement is observed.

2. The system as claimed in claim 1, further comprising a communication system between the converters to deliver the communication signal, wherein the communication system comprises a communication line between each adjacent pair of converters in the sequence and from a last converter in the sequence to a first converter in the sequence.

3. The system as claimed in claim 1, wherein each converter is adapted to:
record an input power during a first time instant;
perform adjusting a duty cycle of its power converter circuit in a first or a second direction according to the communication signal from the preceding converter in the sequence, and detect its input power during a second time instant;
compare the input power at the second and the first time instants; and
generate the communication signal to the next converter in the sequence which communication signal is dependent on a result of the comparing.

4. The system as claimed in claim 3, wherein each converter is adapted to record an input power during a first time instant by:
detecting and storing its input power during the first time instant after receiving the communication signal from the preceding converter in the sequence and before performing adjusting of the duty cycle of its power converter circuit; or
using the input power during the second time instant of a preceding sequence of operations as the input power in the first time instant.

5. The system as claimed in claim 3, wherein the communication signal instructs the next converter to adjust the duty cycle of its power converter circuit in a same direction if the input power at the second time instant is greater than that at the first time instant, or else to adjust the duty cycle of its power converter circuit in an opposite direction.

6. The system as claimed in claim 1, further comprising a controller adapted to adjust a number of converters in the sequence between all converters or only a sub-set of the converters according to a required output power or an input power.

7. The system as claimed in claim 6, wherein the controller comprises any one of a user interface or an automatic control so as to manually or automatically adjust the number of converters in the sequence by implementing a communication line connection between a converter which is selected to be a last in the sequence and a first converter in the sequence.

8. The system as claimed in claim 3, wherein the converter is further adapted to convey in the communication signal information indicative of an amplitude of a difference between the input power at the second time instant and that at the first time instant, and the converter is further adapted to perform adjusting of the duty cycle of its power converter circuit by a step relevant with said information indicative of the amplitude of the difference between the input power.

9. The system as claimed in claim 1, wherein the output terminals of the converters are connected in parallel.

10. A solar power generation system comprising:
a solar cell array; and
a power conversion system as claimed in claim 1, wherein the energy source comprises the solar cell array.

11. The solar power generation system in claim 10, further comprising:
a battery for being charged by the power conversion system; and/or
a grid feeding inverter for being powered by the power conversion system and generating AC power for grid feeding.

12. A power conversion method, comprising:
receiving energy from an energy source;
providing a sequence of operation of a plurality of converters each comprising a power converter circuit, wherein the method comprises for each converter in the sequence:
in response to receipt of a communication signal from a preceding converter in the sequence, performing energy conversion by monitoring an input power, perform an adjustment of a power converter conversion ratio of the power converter circuit, observe whether there is improvement in maximum power point tracking caused by said adjustment and providing a communication signal for a next converter wherein said communication signal is adapted to notify an increase or decrease of the power converter conversion ratio in the next converter, according to whether the improvement is observed.

13. The method as claimed in claim 12, comprising, within each converter in the sequence:
recording an input power during a first time instant;
performing adjusting the power converter conversion ratio of its power converter circuit in a first or a second direction according to the communication signal from the preceding converter in the sequence, and detecting its input power during a second time instant;
comparing the input power at the second and the first time instant; and
generating the communication signal to the next converter in the sequence which is dependent on a result of the comparing.

14. The method as claimed in claim 13, comprising recording an input power during a first time instant by:
detecting and storing its input power during the first time instant after receiving the communication signal from the preceding converter in the sequence and before performing adjusting the power converter conversion ratio of its power converter circuit; or
using the input power during the second time instant of a preceding sequence of operations as the input power in the first time instant.

15. A power converter to be used with an energy source, comprising a pair of input terminals and a pair of output terminals, wherein the input terminals are adapted for connection in parallel with input terminals of other power converters and are for connection to an output of the energy source, an input power monitor and a power converter circuit whose power converter conversion ratio is adjustable; and
the converter is adapted to implement a sequence of operation in cooperation the other converter, in which the converter is adapted:
in response to a communication signal from a preceding converter in the sequence, to perform an adjustment of the power converter conversion ratio of the power converter circuit;
to observe whether there is improvement in maximum power point tracking caused by said adjustment; and then
to provide a communication signal to a next converter in the sequence, wherein said communication signal is adapted to notify an increase or decrease of the power converter conversion ratio in the next converter, according to whether the improvement is observed.

* * * * *